United States Patent [19]

Hrovat

[11] Patent Number: 4,768,608
[45] Date of Patent: Sep. 6, 1988

[54] ANTISLIP CONTROL METHOD AND SYSTEM

[75] Inventor: Davorin Hrovat, Dearborn, Mich.

[73] Assignee: Ford Motor Company, Dearborn, Mich.

[21] Appl. No.: 103,476

[22] Filed: Oct. 1, 1987

[51] Int. Cl.$^4$ ............................................. B60D 31/00
[52] U.S. Cl. ................................ 180/197; 364/426.02
[58] Field of Search ........................ 180/197; 364/426; 340/52 R

[56] References Cited

U.S. PATENT DOCUMENTS 4,554,990  11/1985  Kamiya et al. ...................... 180/197
4,721,176   1/1988  Kabasin ............................... 180/197

FOREIGN PATENT DOCUMENTS 2058819  11/1970  Fed. Rep. of Germany .
2832739   7/1978  Fed. Rep. of Germany .

Primary Examiner—John A. Pekar
Attorney, Agent, or Firm—Allan J. Lippa; Peter Abolins

[57] ABSTRACT

A method and control system for controlling the wheel slip of a vehicle having at least one driven wheel coupled to an internal combustion engine. Feedback variables are generated and summed to generate a feedback control signal for controlling the engine throttle to reduce the wheel slip. One feedback variable is related to engine torque output at the time the torque output is delivered from the engine. More specifically, a measurement of intake manifold pressure is delayed for a time approximately equal to an integer multiple of the time delay between an intake stroke and power stroke of an engine cylinder.

16 Claims, 3 Drawing Sheets

ANTISLIP CONTROL METHOD AND SYSTEM

BACKGROUND OF THE INVENTION

The field of the invention relates to controlling the wheel slip of a driven wheel coupled to an internal combustion engine.

When a vehicle (such as an automobile, truck or motorcycle) encounters a slippery surface, the engine torque applied to the driven wheel may cause the wheel to abruptly accelerate. A temporary loss in vehicle control may result.

An approach to solving the problem of wheel slip is to control the engine throttle in inverse relation to a measured difference in rotation between the driven wheel and the nondriven wheel. For example, U.S. Pat. No. 4,554,990 discloses a control system wherein the difference in rotation between a driven wheel and a nondriven wheel is used as a feedback variable. The other feedback variables are a signal related to actual throttle position, and a signal related to the throttle position commanded by the vehicle operator.

German patents Nos. 2058819 and 2832739 also disclose control systems for controlling the throttle setting in response to wheel speed sensors.

A problem with the above approaches is that the transient response time of the control system is dependant upon the time delay of transmitting engine torque through the drivetrain and wheels.

SUMMARY OF THE INVENTION

An object of the present invention is to provide a feedback control system to control wheel slip with a faster and more stable transient response time than heretofore possible.

The above and other problems are overcome, and object achieved, by providing both a feedback control method and a feedback control system as claimed herein. In one particular aspect of the invention, the feedback control method comprises the steps of: generating a first feedback variable related to the wheel slip of the driven wheel; providing a measurement of manifold pressure in the internal combustion engine; generating a second feedback variable related to engine torque output by delaying the measurement of manifold pressure a predetermined time; summing the first feedback variable and the second feedback variable to generate a feedback control signal; and regulating the engine in response to the feedback control signal to reduce the wheel slip.

The second feedback variable which is related to engine torque is derived from the manifold pressure measurement of the engine. Accordingly, the second feedback variable is not delayed by the transmission of engine torque through the drivetrain and driven wheel. An advantage is thereby obtained of providing a feedback control system having a faster transient response time than heretofore possible.

Preferably, the wheel slip is determined by measuring the difference in speed of the driven wheel as compared to the nondriven wheel. The wheel slip may also be determined by measuring the actual vehicle speed by a radar unit and comparing the actual vehicle speed with the speed of the driven wheel. Further, the wheel slip may be determined by taking the derivative of the wheel speed.

In another particular embodiment of the invention, the feedback control system comprises: difference means coupled to both a driven wheel and a nondriven wheel for providing an electrical signal representative of the wheel slip; first feedback means coupled to the difference means for providing a first feedback variable related to the wheel slip; a pressure sensor coupled to an intake manifold of the internal combustion engine for providing a measurement of manifold pressure; second feedback means coupled to the pressure sensor for providing a second feedback variable related to the torque output of the engine, the second feedback means including a delay means for time-delaying the manifold pressure measurement thereby translating the manifold pressure measurement into a measurement which is related to the torque output of the engine; summation means coupled to the first feedback variable and the second feedback variable for providing a feedback control signal; and regulating means responsive to the feedback control signal for adjusting the internal combustion engine to reduce the wheel slip. Preferably, the regulating means further comprises a servo motor coupled to the throttle of the internal combustion engine. The feedback control system, preferably, further comprises: threshold means for comparing the wheel slip to a predetermined threshold value; and signal selector means having an output coupled to the servo motor and inputs coupled to both the feedback control signal and the throttle command signal, the selector means being responsive to the threshold means for coupling the feedback control signal to the servo motor when the wheel slip is above the predetermined threshold value and for coupling the throttle command signal to the servo motor when the wheel slip is below the predetermined threshold value.

DESCRIPTION OF THE PREFERRED EMBODIMENT

Figure 1:
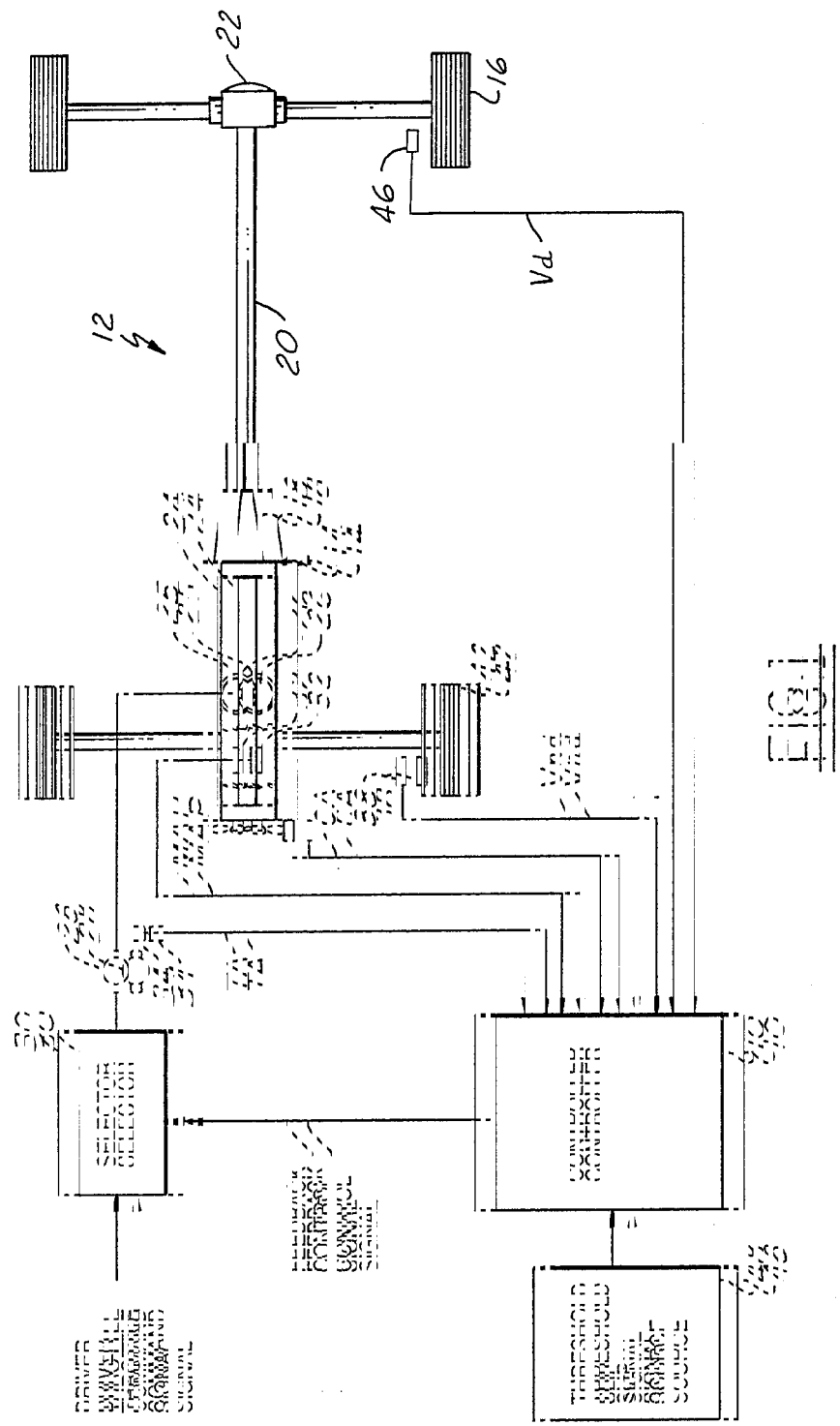
FIG. 1 is a schematic showing a conventional motor vehicle coupled to the feedback control system described herein.

Referring first to FIG. 1, in general terms, conventional microprocessor or controller 10 is shown as a portion of a feedback control system receiving inputs from, and controlling, a conventional motor vehicle 12. Although a motor vehicle is schematically illustrated, the invention described herein may be used to advantage with any apparatus having an internal combustion engine coupled to a drivewheel such as, for example, a motorcycle or truck.

Motor vehicle 12 is shown having an internal combustion engine 14 coupled to drivewheel 16 via transmission 18, drive shaft 20, and differential/axle 22. Other conventional parts such as union joints for coupling engine 14 to drivewheel 16 are not shown because they are not necessary for an understanding of the invention.

Engine 14 is shown including an intake manifold 24 for inducting an air/fuel mixture therein via intake 25. Throttle 26, here shown controlled by servo motor 28, adjusts the torque output of engine 14 by adjusting the air/fuel quantity inducted into engine 14. It is to be understood that the feedback control system described herein may be used with any type of combustion engine such as, for example, carbureted engines, central fuel injected engines, and direct fuel injected engines. Those skilled in the art will also recognize that the torque output of an internal combustion engine may be controlled by numerous methods other than the control of throttle 26 which is shown in the embodiment of FIG. 1. For example, the fuel injected directly into an engine may be controlled, and/or the ignition timing of the engine may be controlled by the feedback control system to reduce engine torque output and, accordingly, reduce the wheel slip.

As described in greater detail hereinafter, selector 30 couples either the driver command signal or the feedback control signal to servo motor 28 as determined by the wheel slip of drivewheel 16. The driver command signal is generated by a conventional transducer (not shown) coupled to the operator actuated gas pedal (not shown) or throttle cable (not shown). In normal operation, when the wheel slip is below a threshold value which is preselected by threshold slip signal source 48, servo motor 28 and the resulting control of throttle 26 are responsive only to the driver throttle command signal. On the other hand, when the wheel slip is above the preselected threshold value, throttle 26 is controlled by the feedback control signal from controller 10 such that the wheel slip is automatically reduced by the feedback control system described hereinbelow.

Controller 10 generates the feedback control signal by an algorithm, described later herein, which is responsive to: absolute manifold pressure sensor (MAP) 32, shown coupled to manifold 24; throttle position sensor 34, shown coupled to throttle 26; speed sensor 38, shown coupled to nondriven wheel 42; speed sensor 46, shown coupled to driven wheel 16; and threshold slip signal source 48.

Figure 2:
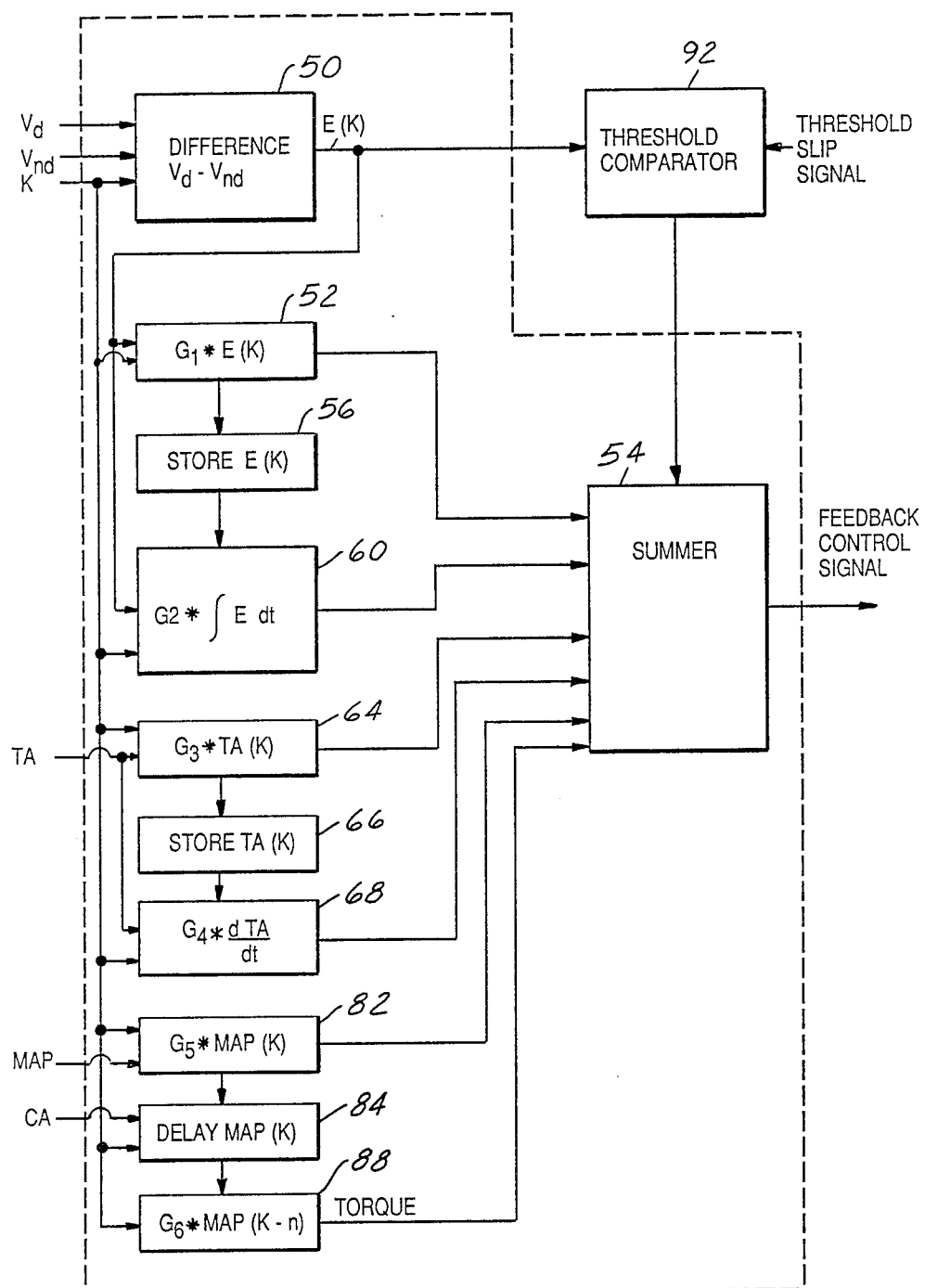
FIG. 2 is an electrical block diagram of a portion of the circuitry shown in FIG. 1.

Referring now to FIG. 2, the feedback control algorithm performed by controller 10 is shown schematically as a flow chart of computational, storage, delay and decision making blocks. Each block shown herein represents a program operation performed by the controller. Those skilled in the art will recognize that the operations may also be performed by discrete components. For example, difference block 50 wherein signal $V_{nd}$ is subtracted from signal $V_d$ may be performed by descrete integrated circuits.

A detailed description of the program and operation of controller 10 is now provided. In step 50, signal $V_d$ and signal are sampled at a sampling instant k and the difference computed to generate error signal E(k), representative of the wheel slip, once each sample period (T). Error signal E(k) is then multiplied one each sample period by a gain constant $G_1$ to generate a feedback variable $G_1 * E(k)$ for summation with other feedback variables (described hereinbelow) in summation step 54.

Error signal E(k) is also stored in store step 56 each sample period for use as an input E(k−1) for integration in gain/integrator step 60 during the subsequent sample period. The integral of E(k) is calculated and multiplied by the gain constant $G_2$ each sample period to generate a feedback variable $G_2 * \int E\, dt$ for summation in summation step 54.

Throttle angle position signal TA is sampled once each sample period and multiplied by gain constant $G_3$ in gain step 64 to generate feedback variable $G_3 * TA(k)$ for summation in summation step 54. Sampled throttle angle position signal TA(k) is also stored in storage step 66 each sample period for use in differentiation step 68. The output of storage step 66 TA(k−1) is therefore delayed one sample period from the subsequent sampled throttle angle signal TA(k). The differential of signal TA(k) is computed in differentiation step 68 by subtracting signal TA(k−1) from signal TA(k) and dividing the difference by $\Delta T$ as shown in the following equation.

$$\frac{d\,TA}{dt} = \frac{TA(k) - TA(k-1)}{\Delta T}$$

This differential is then multiplied by a gain constant $G_4$ to generate feedback variable $G_4 * d\,TA/dt$ for summation in summation step 54.

Absolute manifold pressure signal MAP is sampled each sample period and multiplied by gain constant $G_5$ in gain step 82 to generate feedback variable $G_5 * MAP(k)$ for summation in summation step 54. Sampled signal MAP(k) is also delayed in delay step 84 by a predetermined number of sample periods (n) to generate a signal MAP(k−n) related to the torque output of engine 14. More specifically, the delay is approximately equal to an integer number of time intervals between the induction stroke and the compression stroke. This time delay is derived from a crank angle signal CA which is related to the crank angle of engine 14. Accordingly, the delayed measurement of absolute manifold pressure, MAP(k−n) is proportional to torque output of engine 14 at the time the torque output is generated. Signal MAP(k−n) is then multiplied once each sample period by a gain constant $G_6$ to generate a feedback variable $G_6 * MAP(k-n)$ for summation in summation step 54.

Each feedback variable which has been generated as described hereinabove is then summed in summer circuit 54 to generate the feedback control signal. For the particular embodiment shown in FIG. 2, the feedback control signal is equal to:

$G_1 * E(k) + G_2 * \int E\, dt + G_3 * TA(k) + G_4 * d\,TA/dt + G_5 * MAP(k) + G_6 * MAP(k-n)$ However, the feedback control signal is generated by summer circuit 54 only when threshold comparator 92 determines that the wheel slip is above the predetermined threshold slip value provided by threshold slip signal source 48. Thus, the feedback control system is adjusted in triggering sensitivity for use with different vehicles, engine/drivetrain options, and tires by threshold slip signal source 48.

Figure 3:
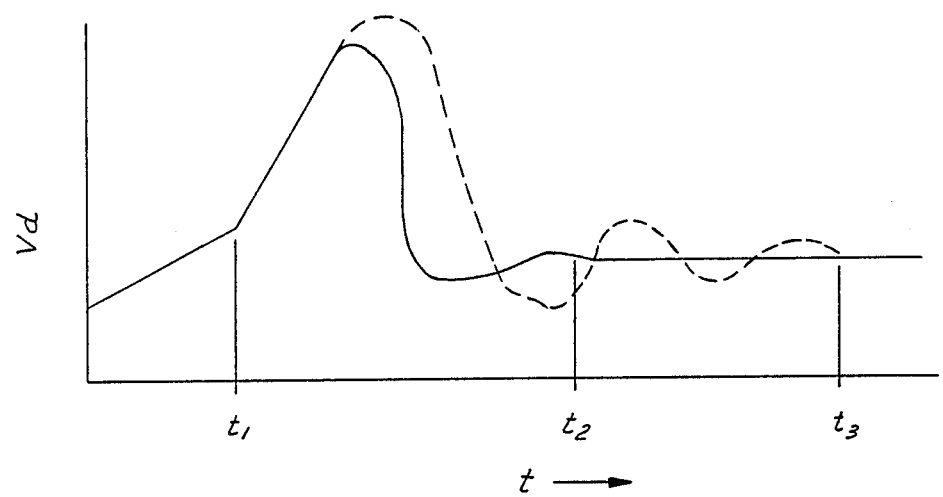
FIG. 3 is a graphical representation of the transient response time of the feedback control system described herein.

The operation of the feedback control system is now described with particular reference to the illustrative example shown in FIG. 3. It is seen that before time $t_1$, the vehicle is accelerating uniformly. During this time, the feedback control system is not active since the wheel slip is below threshold value. Comparator 30 therefore couples the driver throttle command signal to servo motor 28 for control of throttle 26. Stated another way, before time $t_1$, throttle 26 is controlled by an open loop responsive only to the operator.

At time $t_1$, it is shown in FIG. 3 that the driven wheel speed abruptly accelerates due to wheel slippage, such as when accelerating over an icy patch of roadway. Under these conditions, a feedback control signal is generated by controller 10 because the wheel slip is now above the threshold value. Through the action of selector 30, servo motor 28 is then controlled by the feedback control signal.

In response to the feedback control signal, motor 28 reduces the throttle thereby reducing the torque output of engine 14. The reduction in torque output continues until a steady-state condition is achieved at time $t_2$. Since the manifold pressure feedback variable is representative of the actual torque output at the time that torque output occurs, the transient time response is faster and more stable than heretofore possible. For example, the dashed line in FIG. 3 is representative of a feedback control system without a manifold pressure feedback variable wherein a steady-state condition is not reached until time $t_3$. In this type of a system, an indication of engine torque output is obtained by the wheel slip signal after the engine torque is transmitted through the drivetrain. Further, the control system without manifold pressure feedback is also seen to oscillate more during the transient time because of the inherent delay time.

It is to be noted that the generation of a signal representative of the wheel slip $[E(k)]$ is not limited to detecting the difference in speed between a driven wheel and a nondriven wheel. For example, the wheel slip may also be determined by comparing the speed of a driven wheel to the actual vehicle speed. A measurement of actual wheel speed may be obtained from a radar unit such as Doppler Radar Unit II, sold by Dicky-John Corporation of Auburn, Ill. Also, the onset of wheel slip could be detected by the derivative of driven wheel speed.

This concludes description of the preferred embodiment. The reading of it by those skilled in the art will bring to mind many alterations and modifications without departing from the spirit and scope of the invention. For example, the feedback control system described herein may also increase torque output to reduce the wheel slip during deceleration. Accordingly, it is intended that the scope of the invention be limited only by the following claims.

I claim:

1. A feedback control method for controlling the wheel slip of a driven wheel coupled to an internal combustion engine having an intake manifold for inducting air therethrough on an intake stroke of an engine cylinder, comprising the steps of:
   generating a first feedback variable related to the wheel slip;
   providing a measurement of manifold pressure;
   generating a second feedback variable related to engine torque output by delaying said measurement of manifold pressure a predetermined time;
   summing said first feedback variable and said second feedback variable to generate a feedback control signal; and
   regulating the torque output of the engine in response to said feedback control signal to reduce said wheel slip.

2. The feedback control system recited in claim 1 wherein said predetermined time is an integral multiple of the time delay between the intake stroke and power stroke of a engine cylinder.

3. The feedback control system recited in claim 2 wherein said regulating step is responsive to said feedback control signal only when the wheel slip is greater than a predetermined threshold value.

4. The feedback control system recited in claim 3 further comprising a throttle coupled to the manifold and wherein said regulating step comprises the step of adjusting said engine throttle.

5. A feedback control system in a vehicle for controlling the wheel slip of a driven wheel coupled to an internal combustion engine having an intake manifold and throttle for inducting air therethrough on an induction stroke of an engine cylinder, comprising:
   first feedback means coupled to the driven wheel for providing a first feedback variable related to the wheel slip;
   a pressure sensor coupled to the intake manifold for providing a measurement of manifold pressure;
   second feedback means coupled to said pressure sensor for providing a second feedback variable related to the torque output of the engine, said second feedback means including a delay means for time delaying said manifold pressure measurement;
   summation means coupled to said first feedback variable and said second feedback variable for providing a feedback control signal; and
   regulating means responsive to said feedback control signal for adjusting the throttle to reduce the wheel slip.

6. The feedback control system recited in claim 5 wherein said time delay is an integer multiple of the time delay between the intake stroke and associated power stroke of an engine cylinder.

7. The feedback control system recited in claim 6 wherein the vehicle further comprises at least one nondriven wheel and wherein said first feedback means further comprises difference means coupled to both a driven wheel and a nondriven wheel for providing a wheel slip signal representative of the wheel slip of the driven wheel.

8. The feedback control system recited in claim 7 wherein said regulating means further comprises a servo motor coupled to the throttle.

9. The feedback control system recited in claim 8 further comprising: throttle command means for providing a throttle command signal in response to operator actuation; threshold means for comparing the wheel slip to a predetermined threshold value; and signal selector means having an output coupled to said servo motor and inputs coupled to both said feedback control signal and said throttle command signal, said selector means being responsive to said threshold means for coupling said feedback control signal to said servo motor when the wheel slip is above the predetermined threshold value and for coupling said throttle command signal to said servo motor when the wheel slip is below said predetermined threshold value.

10. The feedback control system recited in claim 9 wherein said first feedback means further comprises first gain means for multiplying said wheel slip signal by a first gain constant.

11. The feedback control system recited in claim 10 wherein said second feedback means further comprises second gain means for multiplying said manifold pressure measurement by a second gain constant.

12. A feedback control system for controlling the wheel slip of a vehicle having at least one driven wheel coupled to an internal combustion engine and also having at least one nondriven wheel, the internal combustion engine having an intake manifold and throttle for inducting air therethrough on an induction stroke of an engine cylinder, said feedback control system comprising:
   difference means coupled to both a driven wheel and a non-driven wheel for providing an electrical signal representative of the wheel slip;

first feedback means coupled to said difference means for providing a first feedback variable related to the wheel slip, said first feedback means including a first gain multiplier;

a pressure sensor coupled to the intake manifold;

second feedback means including a time delay coupled to said pressure sensor for providing a second feedback variable related to the torque output of the engine, said second feedback means including a second gain multiplier;

third feedback means coupled to said pressure sensor for providing a third feedback variable related to pressure in the intake manifold, said third feedback means including a third gain multiplier;

summation means coupled to said first feedback variable and said second feedback variable and said third feedback variable for providing a feedback control signal; and a servo motor responsive to said feedback control signal and coupled to the throttle for regulating the throttle to reduce the wheel slip.

13. The feedback control system recited in claim 12 further comprising: throttle command means for providing a throttle command signal in response to operator actuation; threshold means for comparing the wheel slip to a predetermined threshold value; and signal selector means having an output coupled to said servo motor and inputs coupled to both said feedback control signal and said throttle command signal, said selector means being responsive to said threshold means for coupling said feedback control signal to said servo motor when the wheel slip is above said predetermined threshold value and for coupling said throttle command signal to said servo motor when said wheel slip is below said predetermined threshold value.

14. The feedback control system recited in claim 13 further comprising:

a throttle position sensor coupled to the throttle for providing an electrical signal representative of actual throttle angle; and fourth feedback means coupled to said throttle position sensor for providing a fourth feedback variable related to said actual throttle angle, said fourth feedback variable being coupled to said summation means such that said feedback control signal is also dependent upon said fourth feedback variable, said fourth feedback means including a fourth gain multiplier.

15. The feedback control signal recited in claim 14 further comprising:

differentiating means coupled to said throttle position sensor for providing an electrical signal representative of actual throttle angle rate; and fifth feedback means coupled to said differentiating means for providing a fifth feedback variable related to said throttle angle rate, said fifth feedback variable being coupled to said summation means such that said feedback control signal is also dependent upon said fifth feedback variable, said fifth feedback means including a fifth gain multiplier.

16. The feedback control system recited in claim 15 further comprising:

integrating means coupled to said difference means; and sixth feedback means coupled to said integrating means for providing a sixth feedback variable related to an integral of the wheel slip, said sixth feedback variable being coupled to said summation means such that said feedback control signal is also dependent upon said sixth feedback variable, said sixth feedback means including a sixth gain multiplier.

* * * * *